3,189,621
CONVERSION OF FLUORINATED ESTERS TO ETHERS
Marcel Harnik, Morristown, Tenn., assignor to Chemetron Corporation, Chicago, Ill., a corporation of Delaware
No Drawing. Filed Sept. 26, 1962, Ser. No. 226,434
10 Claims. (Cl. 260—397.4)

This invention relates to a new procedure for the conversion of fluorinated esters to ethers. More particularly, this invention relates to conversion of aliphatic esters to aliphatic ethers by treatment of an aliphatic ester wherein the carbon atom bearing the acyloxy substituent is attached to a trifluoromethyl group, with alkali in an aliphatic alcohol.

This application is a continuation-in-part of my copending applications Serial No. 127,776, filed June 20, 1961, now U.S. Pat. No. 3,076,824; Serial No. 129,987, filed August 8, 1961, now abandoned; and Serial No. 139,381, filed September 20, 1961, now U.S. Pat. No. 3,107,256.

The steroid compounds which can be produced in accordance with this invention have useful physiological properties. They have adrenocortical activity and are useful in the relief of inflammation of rheumatoid arthritis and similar collagen and allergic conditions. They have particular utility in inducing thymolytic corticoid activity in mammals and can be applied parenterally in aqueous suspensions or in innocuous organic solvents. They are thus useful in supplementing the cortical hormone production of mammals without the side effects of the androgenic, estrogenic and progestational hormones. The steroid compounds produced herein are also useful as intermediates in the synthesis of physiologically active steroid compounds, and particularly adrenocorticoid compounds. The aliphatic compounds produced by the procedure of this invention are useful as refrigerants, insecticides and aerosol ingredients.

The procedure which comprises this invention can be illustrated by the following general equation:

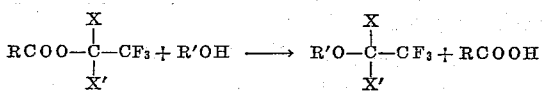

wherein X and X' represent hydrogen atoms or organic radicals and R and R' represent aliphatic organic radicals. In this reaction, the procedure is conducted in an aliphatic alcohol represented by the formula R'OH in the presence of an excess of alkali such as sodium, potassium or lithium hydroxide or sodium, potassium or lithium bicarbonate. The acyl radical, which is represented by RCO is exchanged for an aliphatic radical represented by R', and the acyl radical forms an organic acid RCOOH, which is neutralized by the alkali present.

The foregoing reaction is of wide general applicability and is operative with the wide variety of esters of aliphatic acids, such as formic, acetic, propionic, butyric, isobutyric, valeric, caproic, heptoic, caprylic, nonylic, capric, undecylic, lauric, myristic, palmitic, stearic, oleic, linoleic, ricinoleic, chloroacetic, fluoroacetic, bromoacetic, trichloroacetic, trifluoroacetic, cyclopentylacetic, β-cyclopentylpropionic, cyclohexylacetic, β-cyclohexylpropionic, trimethylacetic, diethylacetic, triethylacetic, acrylic, crotonic, methacrylic, phenylacetic, β-phenylpropionic, naphthylacetic and similar acids.

The substituents represented by X and X' in the foregoing reaction can be hydrogen atoms or any of a wide variety of organic radicals including aliphatic, aromatic and alicyclic radicals. X and X' can represent aliphatic radicals, such as methyl, ethyl, propyl, butyl, amyl, hexyl, octyl, decyl, lauryl, cetyl, ceryl, carnaubyl, myricyl and similar alkyl radicals containing 1 to 30 carbon atoms. X and X' can also represent unsaturated aliphatic radicals, such as vinyl, allyl, crotyl, methallyl, propargyl and similar aliphatic radicals containing 2 to 30 carbon atoms containing one or more double or triple bonds. X and X' can also stand for alicyclic radicals such as cyclopentyl, cyclohexyl, polyhydrophenanthryl and cyclopentanopolyhydrophenanthryl radicals which can contain further substituents, such as hydroxyl, alkoxyl, acyloxyl, acetal, and related substituents, as well as halogen atoms. X and X' can also stand for aromatic, alicyclic and heterocyclic radicals, such as phenyl, tolyl, xylyl, naphthyl, phenanthryl, anthryl, acenaphthyl, chlorophenyl, bromophenyl, hydroxyphenyl, benzhydryl, benzopyranyl, benzyl, biphenylyl, bornyl, camphanyl, cinnamyl, cumyl, cyclohexenyl, cyclopentenyl, cyclopropyl, cymyl, fenchyl, furyl, menthyl, mesityl, phenetyl, pyranyl, phytyl, pyrryl, pyrazolyl, pyrenyl, pyrimidyl, quinolyl, styryl, thenyl, veratryl and similar radicals. The organic radicals represented by X and X' can be further substituted with hydroxy, oxo, halogen, sulfhydryl, amino, carboxy, carbalkoxy, carbamido and related substituents without affecting the generality of the reaction.

The reaction is conducted at relatively low temperature in an aliphatic alcohol in the presence of an excess of alkali. The reaction can be conducted at temperatures in the range of 0° to 100° C. although temperatures in the range of 15–50° C. are preferred. The reaction is complete within a few hours at ordinary temperatures (20–25° C.) and is accelerated at higher temperatures. If the organic compound contains other reactive substituents, it may be desired to conduct the reaction at ordinary temperatures so that the other substituents will not become hydrolyzed or otherwise adversely affected by the alkali. When the reaction is carried out at ambient temperatures (20–25° C.), there is no saponification of ordinary ester radicals under conditions where the desired acyloxy compound is converted to an aliphatic ether.

After the reaction is completed, the desired organic ether can be isolated by conventional procedures, such as acidification to neutralize the alkali present, followed by removal of solvent, as for example, by vacuum distillation, steam distillation or dilution with water, whereupon the organic aliphatic ether which is formed can be removed as by extraction, distillation or precipitation.

The invention is disclosed in further detail by means of the following examples, which are provided for purposes of illustration only, and are not to be construed as limiting the invention in scope. It will be readily understood by those skilled in the art that numerous modifications in starting materials, operating conditions, isolation procedures and the like may be adopted without departing from the invention as herein disclosed.

EXAMPLE I

Conversion of 21-(2,2,2-trifluoro-1-acetoxyethyl)-allopregnane-3β-ol-20-one acetate to 21-(2,2,2-trifluoro-1-methoxyethyl)allopregnane-3β-ol-20-one acetate

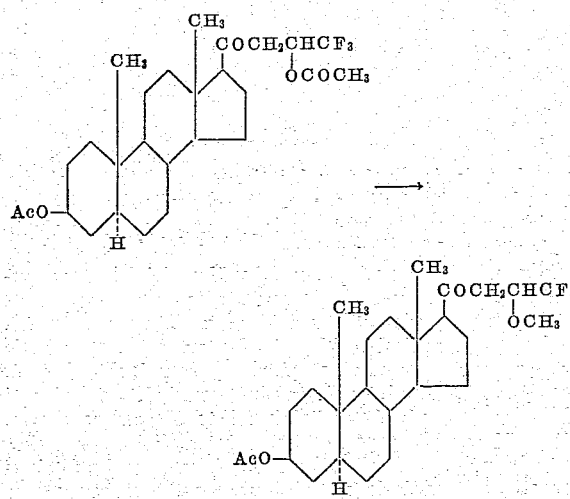

To a solution of 2.2 grams of 21-(2,2,2-trifluoro-1-acetoxyethyl)allopregnane-3β-ol-20-one acetate in 220 ml. of warm methanol was added a solution of 2.2 grams of potassium bicarbonate in 22 ml. of water. The resulting mixture was warmed and stirred for 15 minutes to effect solution of the reactants and then left at room temperature (20° C.) for 48 hours. The reaction mixture was acidified with 3 ml. of acetic acid and the solvent removed by evaporation on a steam bath. Ice was added to the residue and the mixture was extracted with ether. The ether extract was washed with 5% KHCO₃ solution and with water, dried, filtered and evaporated. The oily 21-(2,2,2 - trifluoro-1-methoxyethyl)allopregnane-3β-ol-20-one acetate was chromatographed on magnesium silicate (Florisil) and the benzene-hexane (1:1) eluate yielded 614 mg. of solid product. Recrystallization from heptane gave 302 mg. of 21-(2,2,2-trifluoro-1-methoxyethyl)-allopregnane-3β-ol-20-one acetate of M.P. 135–136° C. Further recrystallization from heptane raised the M.P. to 138–139° C.

EXAMPLE II

Conversion of 16-(2,2,2-trifluoro-1-acetoxyethyl)androstane-3β-ol-17-one acetate to 16-(2,2,2-trifluoro-1-methoxyethyl)androstane-3β-ol-17-one acetate

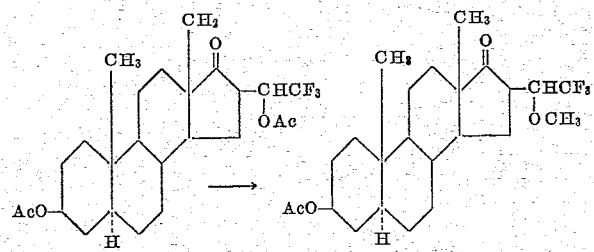

A solution of 2.2 gams of KHCO₃ in 22 ml. of water was added to a solution of 2.2 grams of 16-(2,2,2-trifluoro-1-acetoxyethyl)androstane-3β-ol-17-one acetate in 220 ml. of warm methanol. Stirring and heating effected solution of the reactants. The resulting solution was kept at 25° C. for 15 hours, then acidified with 3 ml. of acetic acid and evaporated under vacuum on a steam bath. Ice was added to the residue and the mixture was extracted with ether. The ether extract was washed with 5% KHCO₃ solution, dried and evaporated. The residue of 16-(2,2,2-trifluoro-1-methoxyethyl)androstane-3β-ol-17-one acetate was recrystallized from hexane; yield 308 mg., M.P. 149–160° C. Further recrystallization from hexane raised the M.P. to 160.5–162° C. The I.R. absorption spectrum of this compound had a peak at 5.74 microns.

EXAMPLE III

Conversion of 16-(2,2,2-trifluoro-1-acetoxyethyl)-androstane-3β-ol-17-one acetate to 16-(2,2,2-trifluoro-1-methoxyethyl)androstane-3β-ol-17-one

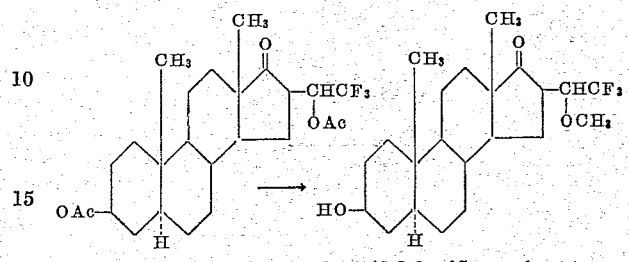

A solution of 0.5 gram of 16-(2,2,2-trifluoro-1-acetoxyethyl)androstane-3β-ol-17-one acetate in 30 ml. of 5% methanolic KOH solution was allowed to stand 1 hour at room temperature (20° C.). The solution was then diluted with water and extracted with ether. The ether extract was washed with water, dried and evaporated. The residue of 16-(2,2,2-trifluoro-1-methoxyethyl)androstane-3β-ol-17-one was crystallized from 30 ml. of heptane; yield 320 mg., M.P. 123–125° C. Further recrystallization raised the M.P. to 125–127° C. The I.R. absorption spectrum had maxima at 3.07 and 5.72 microns.

Treatment of 16-(2,2,2-trifluoro-1-methoxyethyl)-androstane-3β-ol-17-one with an excess of acetic anhydride in anhydrous pyridine gave 16-(2,2,2-trifluoro-1-methoxyethyl)-androstane-3β-ol-17-one acetate of M.P. 160–162° C. after recrystallization from hexane.

EXAMPLE IV

Conversion of 2,2,2-trifluoroethyl acetate to ethyl 2,2,2-trifluoroethyl ether

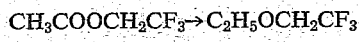

$$CH_3COOCH_2CF_3 \rightarrow C_2H_5OCH_2CF_3$$

To a solution of 50 grams of 2,2,2-trifluoroethyl acetate in 500 ml. of warm ethanol was added a solution of 10 grams of KHCO₃ in 50 ml. of 50° C. water. The resulting mixture was kept at room temperature for 5 hours, then neutralized with acetic acid. The reaction mixture was diluted with 500 ml. of water and continuously extracted with ether for 12 hours. The ether extract was washed with water, dried and fractionally distilled. A fraction distilling at 49–53° C. was obtained and consisted essentially of ethyl 2,2,2-trifluoroethyl ether.

EXAMPLE V

Conversion of 21-(2,2,2-trifluoro-1-acetoxyethyl)-allopregnane-3β-ol-20-one acetate to 21-(2,2,2-trifluoro-1-methoxyethyl)allopregnane-3β-ol-20-one

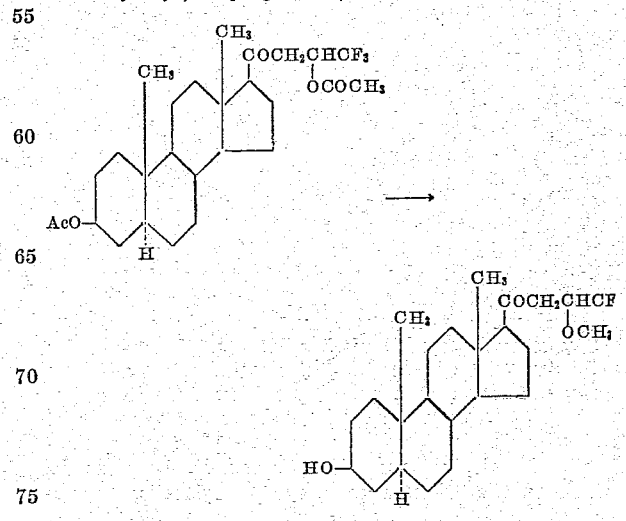

One gram of 21-(2,2,2-trifluoro-1-methoxyethyl)allopregnane-3β-ol-20-one acetate was dissolved in 52 ml. of 5% methanolic KOH solution and the resulting solution allowed to stand at room temperature for 1½ hours. The solution was diluted with water and extracted with ether. The ether extract was washed with water, dried and evaporated. The residue of 21-(2,2,2-trifluoro-1-methoxyethyl)allopregnane-3β-ol-20-one was recrystallized from heptane; yield 450 mg., M.P. 113–117° C. Further recrystallization raised the M.P. to 118.5–119° C.

I claim:

1. A method for converting an ester of the following formula

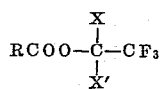

to an ether of the following formula

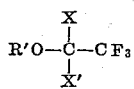

wherein X and X' represents members of the group consisting of hydrogen and organic radicals and R and R' represent aliphatic organic radicals, which comprises reacting said ester with an excess of an alcohol of the formula R'OH in the presence of an excess of alkali and isolating the organic ether thus formed.

2. A method of converting a steroid ester of the formula

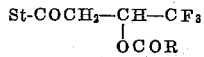

to an ether of the formula

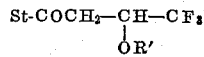

wherein St is a polyhydrocyclopentanophenanthryl radical and R and R' are aliphatic hydrocarbon radicals, which comprises reacting said ester with an alcohol of the formula R'OH in the presence of an excess of alkali and isolating the organic ether thus formed.

3. A method of converting a steroid ester of the formula

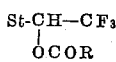

to an ether of the formula

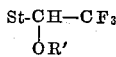

wherein St is a polyhydrocyclopentanophenanthryl radical and R and R' are aliphatic hydrocarbon radicals, which comprises reacting said ester with an alcohol of the formula R'OH in the presence of an excess of alkali and isolating the organic ether thus formed.

4. The method of claim 2 wherein R and R' are alkyl radicals containing 1 to 10 carbon atoms.

5. The method of claim 3 wherein R and R' are alkyl radicals containing 1 to 10 carbon atoms.

6. Method of converting a 21-(2,2,2-trifluoro-1-hydroxy ethyl)allopregnane-3β-ol-20-one diester of an aliphatic carboxylic acid containing 1 to 18 carbon atoms to a 21-(2,2,2-trifluoro-1-alkoxyethyl)allopregnane-3β-ol-20-one ester, wherein the alkyl radical contains 1 to 10 carbon atoms, which comprises reacting said diester with an alkanol containing 1 to 10 carbon atoms in the presence of alkali and isolating the ether thus formed.

7. Method of converting a 16-(2,2,2-trifluoro-1-hydroxyethyl)androstane-3β-ol-17-one diester of an aliphatic carboxylic acid containing 1 to 18 carbon atoms to a 16-(2,2,2-trifluoro-1-alkoxyethyl)androstane-3β-ol-17-one ester, wherein the alkyl radical contains 1 to 10 carbon atoms, which comprises reacting said diester with an alkanol containing 1 to 10 carbon atoms in the presence of alkali and isolating the ether thus formed.

8. The method of claim 6 wherein the aliphatic carboxylic acid is acetic acid and the alkanol is methanol.

9. The method of claim 7 wherein the aliphatic carboxylic acid is acetic acid and the alkanol is methanol.

10. In the method of converting an ester of the group consisting of substituted and unsubstituted β,β,β-trifluoroethyl esters to an ether, the steps comprising reacting said ester with an excess of an alcohol in the presence of an excess of alkali and isolating the ether thus formed.

No references cited.

LEWIS GOTTS, *Primary Examiner.*